(12) United States Patent
Yoshida et al.

(10) Patent No.: US 12,492,338 B2
(45) Date of Patent: Dec. 9, 2025

(54) PHOSPHOR COMPOSITION AND METHOD FOR MANUFACTURING SAME

(71) Applicant: NICHIA CORPORATION, Anan (JP)

(72) Inventors: Shigeki Yoshida, Anan (JP); Hiroyuki Watanabe, Itano-gun (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 478 days.

(21) Appl. No.: 17/999,118

(22) PCT Filed: May 17, 2021

(86) PCT No.: PCT/JP2021/018584
§ 371 (c)(1),
(2) Date: Nov. 17, 2022

(87) PCT Pub. No.: WO2021/235386
PCT Pub. Date: Nov. 25, 2021

(65) Prior Publication Data
US 2023/0183566 A1 Jun. 15, 2023

(30) Foreign Application Priority Data

May 18, 2020 (JP) .................................. 2020-086858

(51) Int. Cl.
*C09K 11/08* (2006.01)
*C09K 11/77* (2006.01)

(52) U.S. Cl.
CPC ...... *C09K 11/0883* (2013.01); *C09K 11/0838* (2013.01); *C09K 11/0872* (2013.01); *C09K 11/77347* (2021.01)

(58) Field of Classification Search
CPC ............ C09K 11/0883; C09K 11/0838; C09K 11/0872; C09K 11/0827; C09K 11/77;
(Continued)

(56) References Cited

U.S. PATENT DOCUMENTS

2012/0256533 A1 10/2012 Seto et al.
2014/0042898 A1* 2/2014 Seto .................. C04B 35/58085
313/503
(Continued)

FOREIGN PATENT DOCUMENTS

JP   H04288394 A   10/1992
JP   2009249445 A  10/2009
(Continued)

OTHER PUBLICATIONS

International Preliminary Report on Patentability dated Dec. 1, 2022 issued in International Application No. PCT/JP2021/018584, 10 pages.

*Primary Examiner* — Matthew E. Hoban
*Assistant Examiner* — Lynne Edmondson
(74) *Attorney, Agent, or Firm* — Hunton Andrews Kurth LLP

(57) ABSTRACT

Provided is a phosphor having superior light-emitting properties. A phosphor composition includes: a nitride phosphor that contains, in a composition thereof, an element M that is at least one selected from the group consisting of rare earth elements except cerium, silicon, nitrogen, and cerium; and an oxyfluoride. In the phosphor composition, a content of the oxyfluoride relative to the phosphor composition is 1.5% by mass or higher and 10% by mass or lower according to an X-ray diffraction reference intensity ratio method.

10 Claims, 3 Drawing Sheets

(58) Field of Classification Search
CPC .......... C09K 11/7704; C09K 11/77347; C09K 11/77747; C09K 11/7719; C09K 11/02; C09K 11/025
See application file for complete search history.

(56) References Cited

U.S. PATENT DOCUMENTS

| | | |
|---|---|---|
| 2016/0040063 A1 | 2/2016 | Shimooka et al. |
| 2018/0002188 A1 | 1/2018 | Nitta et al. |
| 2019/0031956 A1 | 1/2019 | Inata et al. |
| 2019/0153316 A1 | 5/2019 | Liu et al. |
| 2019/0241799 A1 | 8/2019 | Kaneyoshi et al. |
| 2020/0109331 A1* | 4/2020 | Oshio ................ H10H 20/8512 |
| 2020/0141561 A1* | 5/2020 | Grottenmueller .. B29D 11/0074 |
| 2023/0183566 A1* | 6/2023 | Yoshida ............. C09K 11/0883 252/521.1 |

FOREIGN PATENT DOCUMENTS

| | | |
|---|---|---|
| JP | 2010095728 A | 4/2010 |
| JP | 2013170177 A | 9/2013 |
| JP | 2013209578 A | 10/2013 |
| JP | 2016028124 A | 2/2016 |
| JP | 2018021193 A | 2/2018 |
| JP | 2018021198 A | 2/2018 |
| JP | 2019521218 A | 7/2019 |
| JP | 2020019921 A | 2/2020 |
| WO | 2010114061 A1 | 10/2010 |
| WO | 2014123198 A1 | 8/2014 |

\* cited by examiner

PHOSPHOR COMPOSITION AND METHOD FOR MANUFACTURING SAME

CROSS-REFERENCE TO RELATED APPLICATIONS

This application is a national stage entry of International Application No. PCT/JP2021/018584, filed on May 17, 2021, which claims priority to Japanese Patent Application No. 2020-086858, filed on May 18, 2020, the disclosure of which is hereby incorporated by reference in its entirety.

TECHNICAL FIELD

The present disclosure relates to a phosphor composition and a method for manufacturing the phosphor composition.

BACKGROUND ART

A generally white light emitting device converts the color of a portion of the light from a blue light emitting diode (LED) chip using a phosphor and mixes the colors of the blue light from the blue LED chip and the emission from the phosphor to produce white light. A white light emitting device using a combination of a blue laser diode (LD) and a phosphor is also being developed. Examples of the white light emitting device include, for example, a combination of a blue LED chip or a blue LD, and a yellow phosphor. Such a phosphor has been proposed as a yellow phosphor in PCT International Publication, No. 2014-123198, as the one that has a composition represented by $La_3Si_6N_{11}Ce$ (hereinafter, may be referred to simply as "LSN") and that includes Ce as an activator.

SUMMARY OF THE INVENTION

Problem to be Solved by the Invention

Even in the case where LSN is used as a yellow phosphor, further improvement of the light emission property of the phosphor is demanded similar to other phosphors. For example, higher brightness of the phosphor, maintenance of the light emission property even in a higher temperature region, and the like are demanded. An object of an embodiment of the present disclosure is to provide a phosphor that has high brightness and that suppresses degradation of the light emission property in a high temperature region.

Means for Solving Problem

A first embodiment is a phosphor composition including a nitride phosphor that includes, in the composition thereof, an element M that is at least one selected from the group consisting of the rare earth elements except cerium, silicon, nitrogen, and cerium, and an oxyfluoride. In the phosphor composition, the content of the oxyfluoride relative to the phosphor composition is 1.5% by mass or higher and 10% by mass or lower according to an X-ray diffraction reference intensity ratio method.

A second embodiment is a method for manufacturing the phosphor composition, including the steps of providing a raw material mixture that includes an element M source comprising an element M that is at least one selected from the group consisting of rare earth elements except cerium, a cerium source, a silicon source, and a metal fluoride, and obtaining a heat-treated substance by raising a temperature of the raw material mixture and heat-treating the raw material mixture at a predetermined temperature in a range of higher than 1,200° C. and 1,800° C. or lower. In the heat treatment of the raw material mixture, in this manufacturing method, the temperature raising rate for raising from 1,200° C. to the predetermined temperature is lower than 50° C. per hour.

Effect of the Invention

According to an embodiment of the present disclosure, a phosphor that has high brightness and that suppresses degradation of the light emission property thereof in a high temperature region may be provided.

MODES FOR CARRYING OUT THE INVENTION

Figure 1:
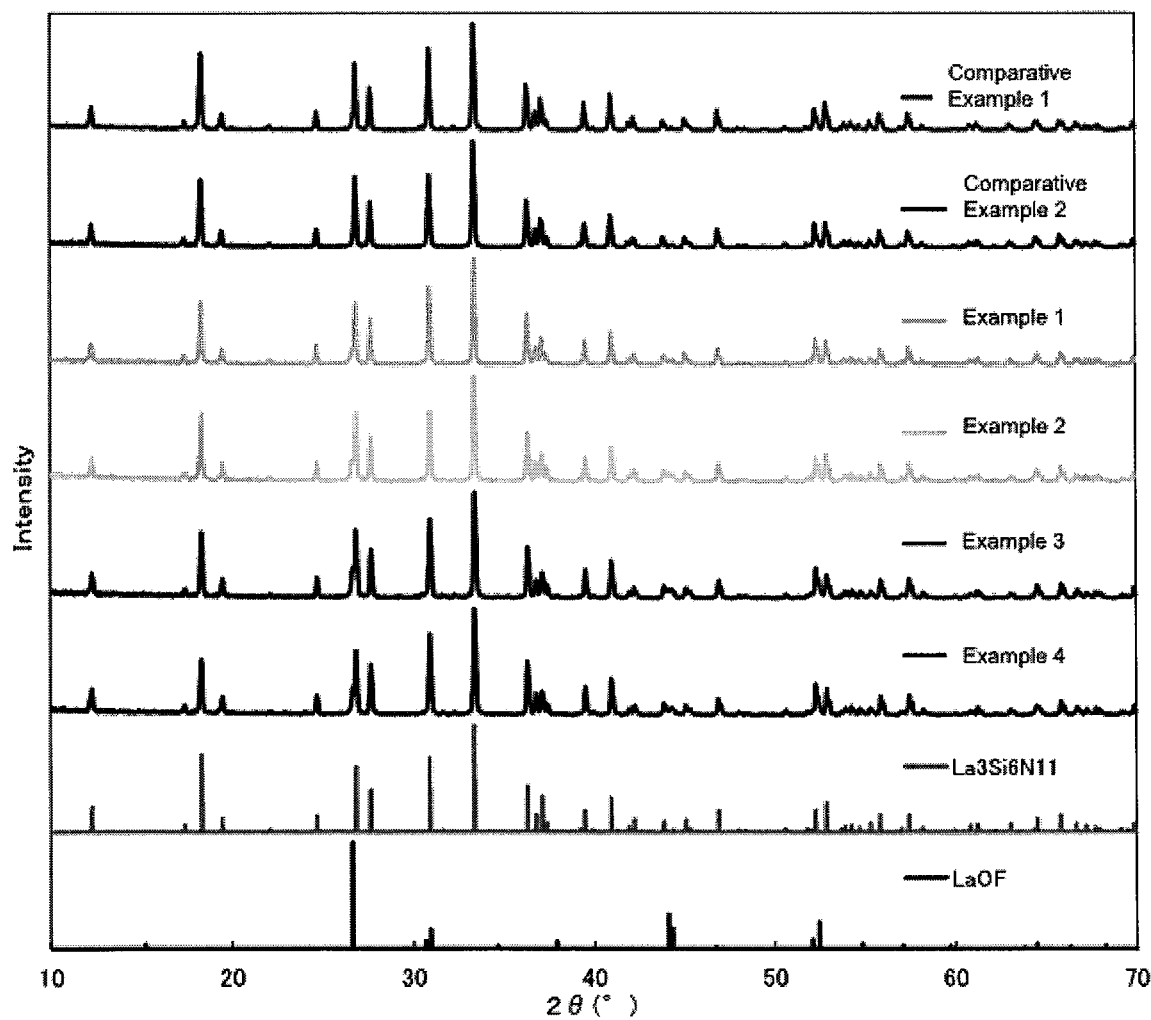
FIG. 1 is exemplary X-ray diffraction spectra of phosphor compositions according to Examples 1 to 4 and Comparative Examples 1 and 2.

A word "step" as used herein includes not only an independent step but also a step with which the initial purpose thereof is achieved even in the case where the step cannot be clearly distinguished from another step. Not especially specified otherwise, in the case where plural substances corresponding to each component are present, the content of each component in the composition means the total amount of the plural substances. As to the upper limit and the lower limit of a numerical range described herein, the values can optionally be selected to be combined. The relation between the name of a color and the chromaticity coordinate, the relation between a light frequency range and the name of a monochromatic light, and the like are in conformity with the provisions of JIS Z8110. An embodiment of the present invention will be described below in detail. The embodiment described below exemplifies a phosphor composition and a method for manufacturing the phosphor composition to embody the technical idea of the present invention, and the present invention is therefore not limited to the phosphor composition and the method for manufacturing the phosphor composition.

Phosphor Composition

A phosphor composition includes a nitride phosphor and an oxyfluoride. The nitride phosphor includes, in the composition thereof, an element M that is at least one selected from the group consisting of the rare earth elements except cerium, silicon, nitrogen, and cerium, and may be activated by cerium. In the phosphor composition, the content of the oxyfluoride relative to the phosphor composition is 1.5% by mass or higher and 10% by mass or lower according to the X-ray diffraction reference intensity ratio method.

The phosphor composition includes, in addition to the nitride phosphor that is the main component thereof, a predetermined amount of the oxyfluoride that may include the component elements of the nitride phosphor, and thereby may achieve high brightness and may suppress gradation of the light emission property in a high temperature region. This may be considered, for example, as follows. Due to the method for manufacturing therefor described later, capture of oxygen included in the raw materials in a trace amount, into the crystal structure of the nitride phosphor is suppressed and production of a product different from the nitride phosphor as the oxyfluoride is promoted. It may be considered that the adverse influence caused by the inclusion of oxygen in the composition of the nitride phosphor may therefore be alleviated, the brightness of the nitride phosphor may thereby be increased, and the temperature property may further be improved.

Examples of the element M included in the nitride phosphor include, for example, scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu), and the element M may be at least one selected from the group consisting of the above. The element M is preferably at least one selected from the group consisting of Sc, Y, La, Gd, and Lu, and is more preferably at least one selected from the group consisting of La, Y and Gd.

The mole-based content ratio of the element M in the composition of the nitride phosphor may be 2.5 or greater and 3.3 or smaller, is preferably 2.8 or greater and smaller than 3.2, and is more preferably 2.9 or greater and 3.1 or smaller, in the case where that of, for example, silicon (Si) is 6. The mole-based content ratio of nitrogen (N) in the composition of the nitride phosphor may be 10 or greater and 12 or smaller, is preferably 10.2 or greater and smaller than 11.5, and is more preferably 10.5 or greater and 11.2 or smaller, in the case where that of, for example, silicon (Si) is 6. The mole-based content ratio of cerium (Ce) in the composition of the nitride phosphor may be greater than 0 and be 0.8 or smaller, preferably exceeds 0.01 and is 0.8 or smaller, more preferably is greater than 0.01 and is smaller than 0.6, and further preferably is 0.1 or greater and smaller than 0.6, in the case where that of, for example, silicon (Si) is 6.

The nitride phosphor may have a composition represented by Formula (1) below.

$$M_p Si_q N_r : Ce_s \quad (1)$$

In Formula (1), M may include at least one selected from the group consisting of Sc, Y, La, Gd and Lu. M includes preferably at least one selected from the group consisting of La, Y and Gd. p may satisfy $2.5 \leq p \leq 3.3$. q may satisfy $5.4 \leq q \leq 6.6$. r may satisfy $10 \leq r \leq 12$. s may satisfy $0 < s \leq 0.8$. s satisfies preferably $0.01 < s < 0.6$. In Formula (1) above, the ratio of q to p may satisfy, for example, $1.6 < q/p < 2.7$. The ratio of r to q may satisfy, for example, $1.5 < r/q < 2.3$.

The nitride phosphor may have a composition represented by Formula (1a) below.

$$M_{3-x} Si_6 N_{11-x} : Ce_x \quad (1a)$$

In Formula (1a), M may include at least one selected from the group consisting of Sc, Y, La, Gd and Lu. M includes preferably at least one selected from the group consisting of La, Y, and Gd. x may satisfy $0 < x \leq 0.8$, and satisfies preferably $0 < x < 0.6$.

The composition represented by Formula (1a) is a theoretical composition. The nitride phosphor may have a composition that is different from the theoretical composition but that is substantially same as the theoretical composition. The expression is substantially same means that the light emission property at a level almost equal to that of the light emission property of the nitride phosphor having the theoretical composition is maintained. The nitride phosphor included the phosphor composition may be one type thereof alone or a combination of two or more types thereof.

The nitride phosphor may include oxygen atoms, fluorine atoms, and the like in the composition thereof. In the case where the nitride phosphor includes oxygen atoms in the composition thereof, the content of the oxygen atoms may be 0.2 moles or less, is preferably 0.15 moles or less, is more preferably 0.12 moles or less, and is further preferably less than 0.05, to 1 mole of, for example, the nitride phosphor. The content of the oxygen atoms may be 0.001 mole or more, is preferably 0.01 mole or more, and is more preferably 0.02 moles or more, to 1 mole of, for example, the nitride phosphor. In the case where the nitride phosphor includes fluorine atoms in the composition thereof, the content of the fluorine atoms, for example, may be 0.1 mole or less, and is preferably less than 0.05 moles, to 1 mole of the nitride phosphor. The content of the fluorine atoms, for example, may be 0.01 mole or more, and is preferably 0.02 moles or more, to 1 mole of the nitride phosphor. The content of each of the oxygen atoms and the fluorine atoms is calculated based on the theoretical composition of the nitride phosphor as the criterion.

In the X-ray diffraction reference intensity ratio method, the content rate of the nitride phosphor in the phosphor composition, for example, may be 90% by mass or higher and 97% by mass or lower, is preferably 92% by mass or higher and 97% by mass or lower, 93% by mass or higher and 97% by mass or lower, or 93% by mass or higher and 96% by mass or lower. The X-ray diffraction reference intensity ratio method is one type of a component quantifying method using an x-ray diffraction (XRD) spectrum. In the X-ray diffraction reference intensity ratio method, a quantitative value of the component to be tested is calculated in a simple manner using the RIR value registered in a database, from the integral intensity at the most intense line of the component to be tested. In this specification, the measurement conditions for the XRD spectrum used in the X-ray diffraction reference intensity ratio method are use of the CuKα-line as the radiation source, and use of the tube current of 20 mA and the tube voltage of 40 kV. For example, Ultima IV manufactured by Rigaku Corporation may be used as the XRD measuring apparatus. The RIR value of the nitride phosphor may be set to be, for example, RIR (I/Ic)=3.42 for $La_3Si_6N_{11}$ 0.01-083-9962. For the RIR value of the nitride phosphor, a powder X-ray diffraction database (PDF) made open to public by the International Center for Diffraction Data (ICDD) may be referred to.

It is preferred that at least a portion of the nitride phosphor have a crystal phase. In the case where at least a portion of the nitride phosphor has a crystal phase, equalization of the component ratios of the nitride phosphor is facilitated. The nitride phosphor has a crystal phase preferably at 50% by mass or higher and more preferably at 80% by mass or higher thereof. The "crystal phase" as used herein means a crystal phase that has luminescence. In the case where 50% by mass or more of the nitride phosphor has a crystal phase, a more excellent light emission property may be acquired. The brightness of the nitride phosphor is higher and the light emission property thereof is improved as the rate of the crystal phase is higher in the nitride phosphor. The processability of the nitride phosphor is higher as the rate of the crystal phase is higher in the nitride phosphor. The nitride phosphor that has a more excellent light emission property and that is more excellent in the processability may therefore be acquired in the case where 80% by mass or more of the nitride phosphor has a crystal phase, The oxyfluoride included in the phosphor composition may be a metal oxyfluoride that includes at least one type of metal element in addition to oxygen and fluorine. The metal element included in the metal oxyfluoride may include, for example, at least one of the metal elements constituting the nitride phosphor may include preferably at least one selected from the group consisting of the element M, Ce, Si, and the like, and may include more preferably at least one selected from the group consisting of La, Y, Gd, Ce, Si, and the like. The oxyfluoride included in the phosphor composition may be one type thereof alone or a combination of two or more types thereof.

In the case where the oxyfluoride includes the element M, the oxyfluoride may include at least one type of element M, oxygen atoms, and fluorine atoms. The element M included in the oxyfluoride may include the same type as that of the element M in the nitride phosphor. The content ratio of the fluorine atoms to the element M in the composition of the oxyfluoride, for example, may be greater than 0 and may be 3.5 or smaller, may also be 0.2 or greater and 3.5 or smaller, and may also be 0.3 or greater and 3 or smaller. The content ratio of the oxygen atoms to the element M in the composition of the oxyfluoride, for example, may be greater than 0 and may be 2 or smaller, may also be 0.1 or greater and 2 or smaller, and may also be 0.3 or greater and 1.5 or smaller. The oxyfluoride including the element M may have a composition represented by, for example, Formula (2) below.

$$MO_tF_u \quad (2)$$

In Formula (2), t satisfies $0<t\leq2$, and u satisfies $0<u\leq3.5$.

The oxyfluoride may have a composition represented by, for example, Formula (2a) below.

$$MO_{(3-y)/2}F_y (0<y<3) \quad (2a)$$

The composition represented by Formula (2a) is a theoretical composition. The oxyfluoride including the element M may have a composition that is different from the theoretical composition but that is substantially same as the theoretical composition. The expression "a composition that is substantially same" means that the oxyfluoride has a composition including the oxygen atoms and the fluorine atoms that correspond to the oxidation number of the element M.

The oxyfluoride including the element M may include Ce in addition to the element M. The composition of the oxyfluoride that includes the element M and Ce may be, for example, a composition formed by substituting a portion of the element M with Ce, of the above composition of the oxyfluoride that includes the element M. The oxyfluoride may also include Si.

The content of the oxyfluoride included in the phosphor composition relative to the phosphor composition may be 1.5% by mass or higher and 10% by mass or lower according to the X-ray diffraction reference intensity ratio (RIR) method. The content of the oxyfluoride to the phosphor composition is preferably 3% by mass or higher and 8% by mass or lower, 3% by mass or higher and 7% by mass or lower, or 3% by mass or higher and 6.7% by mass or lower. As to the RIR value of the oxyfluoride, in the case where, for example, La is included as the element M, RIR (I/Ic)=13.02 may be employed assuming LaOF:01-085-3679. For the RIR value of the oxyfluoride, PDF of ICDD may be referred to.

The content of the oxyfluoride included in the phosphor composition to the nitride phosphor may be calculated from the elemental analysis values of the phosphor composition. The content of the oxyfluoride to 1 mole of the nitride phosphor, calculated from the element analysis values of the phosphor composition, may be, for example, 0.1 mole or more and 0.4 moles or less. The content of the oxyfluoride to 1 mole of the nitride phosphor is preferably 0.12 moles or more and 0.32 moles or less, 0.14 moles or more and 0.28 moles or less, or 0.2 moles or more and 0.26 moles or less. The elemental analysis values of the phosphor composition may be measured using, for example, an X-ray fluorescence analysis (XRF), an ion chromatography, or a nitrogen and oxygen analyzing apparatus. The theoretical compositions are used as the compositions of the nitride phosphor and the oxyfluoride that are used in the calculation of the contents. The content of the oxyfluoride to the nitride phosphor may be calculated using the RIR method.

The volume average particle diameter of the phosphor composition, for example, may be 5 μm or larger and 40 μm or smaller, and is preferably 5 μm or larger and 35 μm or smaller, more preferably 10 μm or larger and 30 μm or smaller, or 12 μm or larger and 25 μm or smaller. When the volume average particle diameter of the phosphor composition is in the above range, the absorption efficiency and the conversion efficiency of the light may be further improved. In the case where the volume average particle diameter of the phosphor composition is 5 μm or larger, formation of aggregates may be more effectively suppressed. It is preferred for the phosphor composition that the frequency distribution of the phosphor particles each having the particle diameter equal to the above value of the volume average particle diameter is high. It is preferred for the particle size distribution of the phosphor particles that the phosphor particles distribute in a narrow range. When the dispersion of each of the particle diameter and the particle size distribution is small, the phosphor composition having excellent optical features may be acquired. The "volume average particle diameter" as used herein is measured using a micro-pore electric resistance method (an electric detection band method) based on the Coulter principle. The micro-pore electric resistance method is a particle measuring method that utilizes the electric resistance. For example, this is a method of determining the particle diameter of each of the particles included in the phosphor composition based on the electric resistance generated when the particles pass through an aperture tube after dispersing the phosphor composition in an electrolytic solution.

The phosphor composition in which the content of the oxyfluoride relative to the phosphor composition (hereinafter, also simply referred to as "content of the oxyfluoride") is 1.5% by mass or higher by the X-ray diffraction reference intensity ratio method, can achieve high brightness. The phosphor composition in which the content of the oxyfluoride is 1.5% by mass or higher by the X-ray diffraction reference intensity ratio method, suppresses deterioration of the light emission property in a high temperature region. The light emission property in the high temperature region can be evaluated using a maintenance rate of the brightness at a predetermined temperature (such as, for example, 300° C.) to the brightness at the room temperature (such as, for example, 25° C.).

Method for Manufacturing Nitride Phosphor

The above phosphor composition may be manufactured by the following manufacturing method. The method for manufacturing the nitride phosphor includes, for example, a providing step of providing a raw material mixture, and a heat treatment step of applying heat treatment to the provided raw material mixture to obtain a heat-treated substance. The method for manufacturing the nitride phosphor may further include a crushing step of cracking and crushing the heat-treated substance, a washing step of washing the crushed heat-treated substance, a classifying step of classifying the obtained nitride phosphor, and the like.

In the providing step, the raw material mixture is provided that includes at least one type of element M source including the element M that is at least one selected from the group consisting of the rate earth elements except cerium (Ce), at least one type of cerium (Ce) source, and at least one type of silicon (Si) source. The raw material mixture may further include a metal fluoride. The metal fluoride may be, for example, a what-is-called flux agent.

The element M source including the element M in the raw material mixture may be at least one selected from the group consisting of a compound including the element M, an elemental substance of the element M, and an alloy including the element M. Examples of the compound including the element M include an oxide of the element M, a hydroxide thereof, a nitride thereof, a hydride thereof, a carbonate thereof, a phosphate thereof, a silicate thereof, a halide thereof, and a silicide thereof, and the compound is preferably at least one selected from the group consisting of a nitride thereof, an oxide thereof, a silicide thereof, a hydride thereof, and the like. The content of the oxygen atoms included in the obtained phosphor may be reduced by using the nitride of the element M, a silicide thereof, a hydride thereof, or elemental substance of the element M as the element M source. In the case where the element M is, for example, lanthanum (La), examples of the compound including La include, for example, lanthanum nitride (such as, for example, LaN), lanthanum oxide (such as, for example, $La_2O_3$), lanthanum silicide (such as, for example, LaSi, $LaSi_2$), lanthanum fluoride (such as, for example, $LaF_3$), and lanthanum hydride (such as, for example, $LaH_2$, $LaH_3$). The element M source may be one type thereof alone or may be a combination of two or more types thereof. The element M source may include one type of the element M or may include two or more types of the element M.

The Ce source in the raw material mixture may be at least one selected from the group consisting of a compound including Ce, an elemental substance of Ce, and a Ce alloy. Ce may function as, for example, an activator in the nitride phosphor. Examples of the compound including Ce include an oxide of Ce, a nitride thereof, a hydride thereof, a carbonate thereof, a phosphate thereof, a silicate thereof, a halide thereof, a silicide thereof, and the like, and the compound is preferably at least one selected from the group consisting of a nitride thereof, a hydride thereof, an oxide thereof, a halide thereof, a silicide thereof, a hydride thereof, and the like, and is more preferably a halide thereof (especially, a fluoride thereof). The content of the oxygen atoms included in the obtained phosphor may be reduced by using the nitride of Ce, the elemental substance of Ce, or a halide thereof as the Ce source. In the case where cerium fluoride (such as, for example, $CeF_3$) is used as the Ce source, the cerium fluoride not only functions as the Ce source of the nitride phosphor but also may function as a flux agent. The cerium fluoride may therefore be advantageously used as the Ce source. The Ce source may be one type thereof alone, or may be two or more types thereof in combination.

The Si source in the raw material mixture may be at least one selected from the group consisting of a compound including Si, an elemental substance of Si, and a Si alloy. The Si source may include a silicide in the element M source and the Ce source. The Si source may also act as at least a portion of at least one of the element M source and the Ce source. Examples of the compound including Si include an oxide of Si, a nitride thereof, a halide thereof, an imidide thereof, and the like, and the compound is preferably a nitride thereof, an oxide thereof, an imidide thereof, and the like. The content of the oxygen atoms included in the obtained phosphor may be reduced by using the nitride of Si, the elemental substance of Si, or a silicide as the Si source. Examples of the compound including silicon include, for example, silicon nitride ($Si_3N_4$), a silicon oxide ($SiO_2$, SiO), and silicon imide ($Si(NH)_2$). Even in the case where an elemental substance of Si is used as the Si source, the nitride phosphor that is inexpensive and that is excellent in the crystallinity may be synthesized. It is preferred that the purity of the Si source be 2 N or higher, while the Si source may include different elements such as Li, Na, K, and B. A portion of Si in the Si source may be substituted by Al, Ga, In, Tl, Ge, Sn, Ti, Zr, Hf, and the like. In the case where the Si source includes other elements, the content thereof may be, for example, 5% by mole or higher to Si. The content of each of the other elements included in the Si source, to Si, may be, for example, 20% by mole or lower, and is preferably 10% by mole or lower, or lower than 1% by mole. The Si source may be one type thereof alone, or may be two or more types thereof in combination.

The mixing ratios of the element M source, the Ce source, and the Si source in the raw material mixture may be selected as necessary depending on the composition to be aimed. The mixing amounts of the element sources may be adjusted such that the stoichiometric ratios are established according to the composition represented by, for example, Formula (1) or Formula (1a). To suppress production of any nitride phosphor (such as, for example, $MSi_3N_5$) having the composition different from the aimed composition, the element M source may excessively be input by up to about 24% by mass exceeding the mixing amount thereof based on the stoichiometric ratio thereof.

The raw material mixture may further include at least one type of metal fluoride. The metal fluoride functions as, for example, a flux agent, produces a liquid phase in a heat treatment step described later, and has a function of promoting the synthesis reaction of the nitride phosphor. The inclusion of the metal fluoride in the raw material mixture suppresses capture of the oxygen atoms in the raw materials, into the crystal phase of the nitride phosphor and may thereby further improve the brightness of the nitride phosphor. A metal fluoride may be included in the raw material mixture as at least one of the element M source and the Ce source. The raw material mixture may include one type of the metal fluoride alone or may include two or more types thereof in combination. The content of the metal fluoride in the raw material mixture may be, for example, 0.01% by mass or higher and 15% by mass or lower. When the content of the metal fluoride is 0.01% by mass or higher, the particles of the nitride phosphor become large and the nitride phosphor having higher brightness tends to be able to be obtained. When the content of the metal fluoride is 15% by mass or lower, the addition amount of a flux agent may be suppressed to the least necessary amount and the nitride phosphor having higher brightness tends to be able to be obtained. In the case where the raw material mixture includes the metal fluoride as at least one of the element M source and the Ce source, the content of the metal fluoride may be a content included in addition to the contents of the element M source and the Ce source selected according to the aimed composition, or may be included in the contents of the element M source and the Ce source selected according to the aimed composition.

The raw material mixture may further include a flux agent other than the metal fluoride. Examples of the flux agent other than the metal fluoride include a halide other than a fluoride of a rate earth element, a halide other than a fluoride of an alkaline metal element, and a halide other than a fluoride of an alkaline earth metal element, and the like. The raw material mixture may include one type of the flux agent alone, or may include two or more types thereof in combination.

The raw material mixture may be obtained by crushing and mixing the weighed element sources with each other. The crushing and the mixing of the element sources may be executed in a dry or a wet manner using a mixing machine. The crushing and the mixing by a mixing machine may be executed by a ball mill that is usually used industrially and, in addition, by a combination of a crushing machine such as a vibration mill, a roll mill, a jet mill, or a mortar and a pestle, with a mixer such as a ribbon blender, a V-shaped blender, or a Henschel mixer, that is usually used industrially. The specific surface area of the raw materials may be increased by executing the crushing of the raw materials. To set the specific surface area of the raw material powder to be in a specific range, the raw material powder may be classified using a wet classifying machine such as a sedimentation tank, a hydrocyclone, or a centrifugal separator, or a dry classifying machine such as a cyclone or an air separator, that is usually used industrially. In the case where the raw materials are unstable in the atmosphere, the crushing and the mixing may be executed in an inert gas atmosphere such as an argon atmosphere, or a nitrogen atmosphere. The raw material mixture may be obtained by executing the crushing and the mixing as above.

In the heat treatment step, the prepared raw material mixture is heat-treated at a predetermined temperature of higher than 1,200° C. and 1,800° C. or lower to obtain the heat treated substance. In the heat treatment step, the temperature raising rate for raising from 1,200° C. to the predetermined temperature is set to be lower than 50° C. per hour. The heat treatment step may include a first temperature raising step of raising the temperature to 1,200° C., a second temperature raising step of raising the temperature from 1,200° C. to the predetermined temperature, and a constant temperature heat treatment step of maintaining the predetermined temperature. The temperature raising rate in the first temperature raising step and that of the second temperature raising step each may be selected as necessary taking into consideration the powder property, the workability, and the like. The expression "the temperature raising rate" as used herein means the average temperature raising rate that is obtained by dividing the difference between the temperature at the end of the temperature raising and temperature at the start of the temperature raising, by the time period necessary for the temperature raising. The temperature raising amount per unit time during the temperature raising (the temperature raising percentage) therefore does not need to be necessarily constant, and variation of the temperature raising percentage during the temperature raising is permitted.

In the first temperature raising step, the temperature of the raw material mixture is raised from the room temperature (such as, for example, 25° C.) to 1,200° C. The temperature raising rate in the first temperature raising step, for example, may be 400° C. or lower per hour, and is preferably 350° C. or lower per hour, or 320° C. or lower per hour. The lower limit of the temperature raising rate in the first temperature raising step, for example, may be 100° C. or higher per hour, and is preferably 200° C. or higher per hour or 250° C. or higher per hour.

In the second temperature raising step, the temperature of the raw material mixture is raised from 1,200° C. to the predetermined temperature of higher than 1,200° C. The predetermined temperature may be 1,300° C. or higher and 1,800° C. or lower, and is preferably 1,350° C. or higher and 1,800° C. or lower, 1,400° C. or higher and 1,800° C. or lower, or 1,400° C. or higher and 1,600° C. or lower. The predetermined temperature, for example, may be about 1,400° C.±50° C., and may be preferably about 1,400° C.±20° C. or about 1,400° C.±10° C. The temperature raising rate in the second temperature raising step is lower than 50° C. per hour, is preferably 40° C. or lower per hour, 30° C. or lower per hour, 20° C. or lower per hour, or 10° C. or lower per hour in the temperature range from 1,200° C. to the predetermined temperature (such as, for example, 1,400° C.). The lower limit of the temperature raising rate in the second temperature raising step, for example, may be 0.1° C. or higher per hour, and is preferably 0.5° C. or higher per hour. In the second temperature raising step, production as the oxyfluoride using the oxygen atoms included in the raw material mixture may be promoted by properly controlling the temperature raising rate. It may be considered that inclusion of the oxygen atoms included in the raw material mixture in the composition of the nitride phosphor may be suppressed. The adverse influence caused by the inclusion of oxygen in the composition of the nitride phosphor is thereby reduced and the nitride phosphor that has high brightness and that suppresses the degradation of the light emission property in a high temperature region may be obtained.

In the constant temperature heat treatment step, the predetermined temperature of higher than 1,200° C. is maintained to apply heat treatment to the raw material mixture. The time period of the heat treatment in the constant temperature heat treatment step, for example, may be 1 hour or longer and 30 hours or shorter, and is preferably 5 hours or longer and 20 hours or shorter. For the maintenance of the predetermined temperature in the constant temperature heat treatment step, temperature variation of, for example, 20° C. or lower and preferably lower than 10° C. is permitted.

The heat treatment step may further include, before the first temperature raising step, a primary heat treatment step of preliminarily applying heat treatment to the raw material mixture. The raw material mixture in the first temperature raising step may therefore be a precursor obtained in the primary heat treatment step. The heat treatment temperature in the primary heat treatment step, for example, may be 1,000° C. or higher and 1,200° C. or lower, and may be preferably 1,100° C. or higher and 1,200° C. or lower. The time period of the heat treatment in the primary heat treatment step, for example, may be 1 hour or longer and 6 hours or shorter, may be preferably 2 hours or longer or 3 hours or longer, or may be preferably 5 hours or shorter. The nitride phosphor more excellent in the light emission property tends to be obtained by applying the primary heat treatment to the raw material mixture.

The heat treatment for the raw material mixture may be executed by placing the raw material mixture in a melting pot, a boat, or the like that is made from silicon carbide (SiC), quartz, alumina, boron nitride (BN), a metal, or the like. The atmosphere in the neat treatment step may be, for example, a reducing atmosphere. The reducing atmosphere may be an atmosphere that includes a reducing gas, and may be a mixed atmosphere of a reducing gas and an inert gas. Examples of the reducing gas include, for example, a hydrogen gas, an ammonia gas, a carbon monoxide gas, and a hydrocarbon gas. Examples of the inert gas include, for example, a noble gas such as a nitrogen gas or an argon gas. In the case where the atmosphere in the heat treatment includes a reducing gas and an inert gas, the content of the reducing gas in the atmosphere, for example, may be 1% by volume or higher and 10% by volume or lower, and is preferably 3% by volume or higher and 4% by volume or lower. It is preferred that the content of the reducing gas in the atmosphere be set to be a content for which the safety during the work is taken into consideration according to the type of the reducing gas. The pressure in the heat treatment step may be, for example, the atmospheric pressure or higher and 10 atmospheres or lower. The heat treatment for the raw material mixture may be executed using, for example, a tube furnace, a high frequency furnace, a metal furnace, an atmosphere furnace, or a gas pressuring furnace.

The method for manufacturing the nitride phosphor may further include a crushing step of cracking and crushing the heat-treated substance obtained in the heat treatment step to obtain a crushed substance. The powder-like nitride phosphor may be obtained by cracking and crushing the heat-treated substance. The cracking and the crushing for the heat-treated substance may be executed using, for example, a crusher such as a hammer mill, a roll mill, a ball mill, a jet mill, a ribbon blender, a V-shaped blender, or a Henschel mixer, and may be executed using a mortar and a pestle.

The method for manufacturing the nitride phosphor may further include a washing step of washing, using a liquid medium, the crushed heat-treated substance that is obtained at the crushing step. At least a portion of impurities may be removed, and the light emission efficiency of the nitride phosphor is further improved by washing the crushed heat-treated substance using the liquid medium. The washing step may include acquisition of a dispersant by dispersing the heat-treated substance in a liquid medium, and acquisition of a solid by executing solid-liquid separation for the dispersant, and may further include drying the solid after the solid undergoes the solid-liquid separation. The liquid medium may include at least, for example, water. In addition to water, the liquid medium may further include a water-soluble organic solvent such as alcohol. The amount of the liquid medium used for dispersing the heat-treated substance, for example, may be a 5-fold amount or more and a 20-fold amount or less, and is preferably a 6-fold amount or more and a 15-fold amount or less, to the mass of the heat-treated substance. The temperature of the dispersant may be, for example, about the room temperature (25° C.). The dispersion time period, for example, may be 10 minutes or longer and 100 hours or shorter, and is preferably 1 hour or longer and 50 hours or shorter.

The solid-liquid separation of the dispersant may be executed using a method that is usually used industrially such as, for example, filtration, suction filtration, pressuring filtration, centrifugal separation, or decantation. The solid collected by the solid-liquid separation may be dried using an apparatus that is usually used industrially such as a vacuum dryer, a hot air heating dryer, a conical dryer, or a rotary evaporator. The drying temperature, for example, may be 50° C. or higher and 200° C. or lower, and is preferably 80° C. or higher and 130° C. or lower. The drying time period, for example, may be 0.5 hours or longer and 200 hours or shorter, and is preferably 1 hour or longer and 20 hours or shorter.

The washing step in the method for manufacturing the nitride phosphor may further include an acid treatment step that includes bringing the solid after the solid-liquid separation into contact with a liquid catalyst that includes an acid component, and removing at least a portion of the acid component adhering to the solid. At least a portion of the portion other than the targeted crystal phase may be removed by the acid treatment step, and the content of an impurity phase included in the nitride phosphor may therefore be reduced. The light emission property of the nitride phosphor may thereby be improved.

Examples of the acid component include an inorganic acid such as hydrochloric acid, nitric acid, sulfuric acid, phosphoric acid, or hydrofluoric acid, an organic acid such as formic acid or acetic acid. The acid component included in the liquid medium may be one type thereof alone, or two or more types thereof in combination. The combinations of two or more types of the acid component include, for example, aqua regia. The liquid medium may include, for example, at least water. In addition to water, the liquid medium may further include a water-soluble organic solvent such as alcohol. The content of the acid component in the liquid medium may be, for example, 0.1% by mass or higher and 40% by mass or lower, and is preferably 5% by mass or higher and 10% by mass or lower. The amount of the liquid medium including the acid component used for the contact with the solid, may be, for example, a 0.5-fold amount or more and a 50-fold amount or less, to the mass of the solid. The temperature for the contact may be, for example, 5° C. or higher and 70° C. or lower, and is preferably 10° C. or higher and 50° C. or lower. The contact time period may be, for example, 10 minutes or longer and 100 hours or shorter, and is preferably 30 minutes or longer and 5 hours or shorter.

After bringing the solid and the liquid medium including the acid component into contact with each other, at least a portion of the acid component adhering to the solid is removed. Examples of the removing method include, for example, contact with a liquid medium (such as, for example water), drying, and the like. In the case where the contact with a liquid medium is applied to the removal of the acid component, solid-liquid separation, drying, and the like may be executed after the contact with the liquid medium. The details of each of the solid-liquid separation, the drying, and the like are as above. A classification process may be executed for the solid from which the acid component is removed.

EXAMPLES

The present invention will be described below in more detail with reference to Examples while the present invention is not limited to these Examples.

Example 1

A lanthanum nitride (LaN) as the La source, a silicon nitride ($Si_3N_4$) as the Si source, and a cerium fluoride ($CeF_3$) as the Ce source acting also as a flux agent were used. The raw materials were weighed such that the mole ratios of the elements were La:Si:Ce=3.19:6:0.16. In detail, 48.79 g of LaN, 28.06 g of $Si_3N_4$, and 3.15 g of $CeF_3$ were weighed.

The weighed raw materials were fully crushed and mixed with each other in a dry manner to obtain a raw material mixture. The obtained raw material mixture was packed in a melting pot to apply thereto the primary heat treatment at 1,200° C. for 4 hours in a reducing atmosphere to obtain a precursor. The obtained precursor was crushed and was again packed in a melting pot to apply thereto the heat treatment at 1,400° C. for 5 hours in a reducing atmosphere. In this treatment, the temperature raising rate for raising from the room temperature to 1,200° C. was set to be 300° C. per hour and the temperature raising rate for raising from 1,200° C. to 1,400° C. was set to be 25° C. per hour to obtain a heat-treated substance. The obtained heat-treated substance was crushed and was dispersed in water for 2 hours, and a solid was thereafter collected by solid-liquid separation. The collected solid was stirred in a hydrochloric acid aqueous solution of 7% by mass for 1 hour and was thereafter washed in water and the like until pH thereof reached about pH=7.0 to be neutral, to be dried. A powder-like phosphor composition of Example 1 was thereby obtained.

Example 2

A phosphor composition of Example 2 was synthesized in the same procedure as that of Example 1 except the fact that the temperature raising rate for raising from 1,200° C. to 1,400° C. in the second heat treatment was adjusted to be 10° C. per hour.

Example 3

A phosphor composition of Example 3 was synthesized in the same procedure as that of Example 1 except the fact that the temperature raising rate for raising from 1,200° C. to 1,400° C. in the second heat treatment was adjusted to be 5° C. per hour.

Example 4

A phosphor composition of Example 4 was synthesized in the same procedure as that of Example 1 except the fact that the temperature raising rate for raising from 1,200° C. to 1,400° C. in the second heat treatment was adjusted to be 1° C. per hour.

Comparative Example 1

A phosphor composition of Comparative Example 1 was synthesized in the same procedure as that of Example 1 except the fact that the temperature raising rate for raising from 1,200° C. to 1,400° C. in the second heat treatment was adjusted to be 50° C. per hour.

Comparative Example 2

A phosphor composition of Comparative Example 2 was synthesized in the same procedure as that of Example 1 except the fact that the temperature raising rate for raising from 1,200° C. to 1,400° C. in the second heat treatment was adjusted to be 300° C. per hour.

X-Ray Diffraction (XRD) Spectrum

Figure 2:
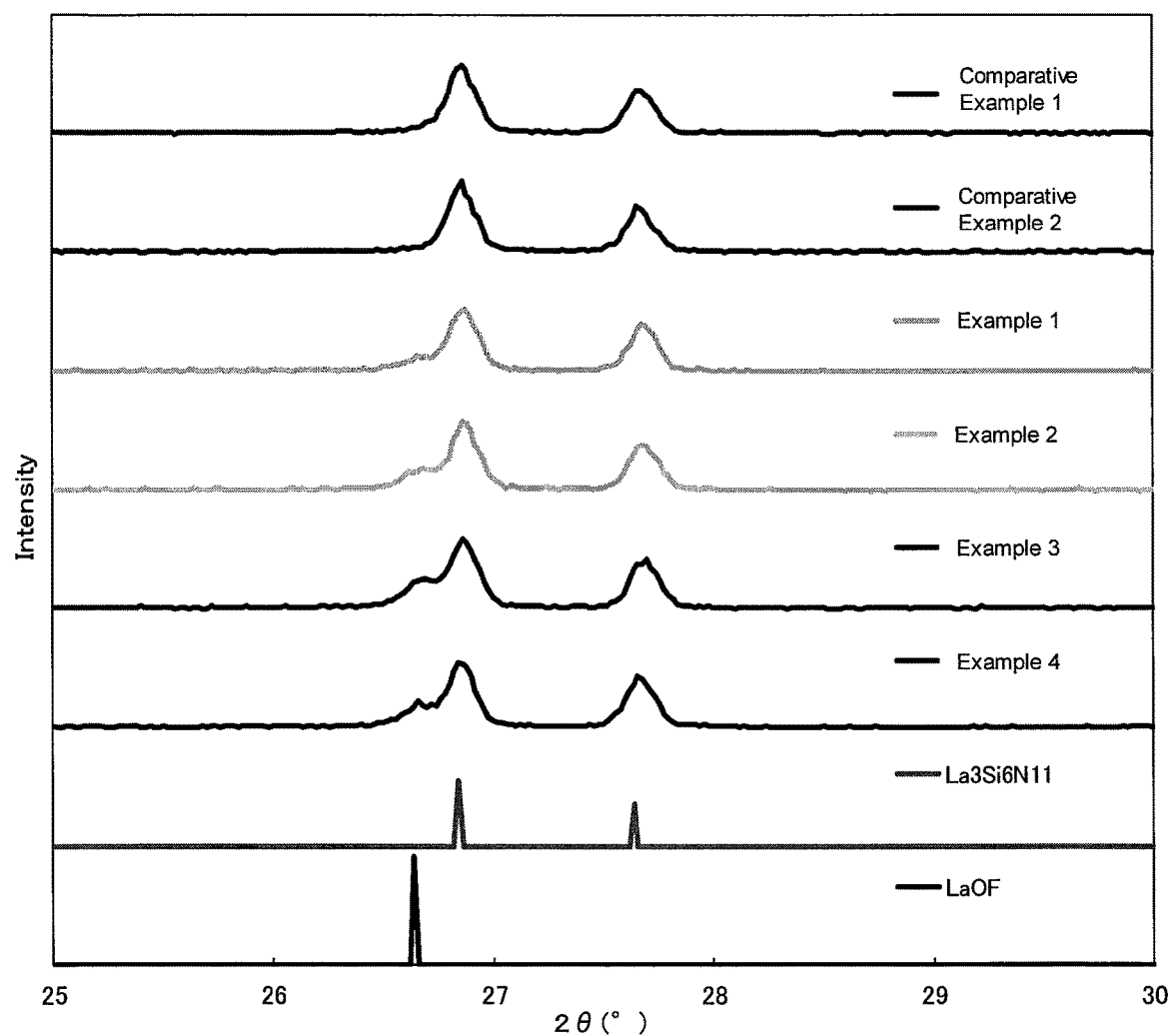
FIG. 2 is exemplary partially enlarged X-ray diffraction spectra of the phosphor compositions according to Examples 1 to 4 and Comparative Examples 1 and 2.

X-ray diffraction (XRD) spectra were measured for the phosphor compositions of Examples 1 to 4 and Comparative Examples 1 and 2. The measurement was executed using Ultima IV manufactured by Rigaku Corporation as the measuring apparatus and the CuKα-line as the radiation source, with the tube current of 20 mA and the tube voltage of 40 kV. FIG. 1 and FIG. 2 show the XRD spectra of the phosphor compositions of Examples 1 to 4 and Comparative Examples 1 and 2

As shown in FIG. 2, a peak derived from LaOF was recognized in the vicinity of 2θ=26.6° for each of the phosphor compositions of Examples 1 to 4 while this peak was almost not recognized for those of Comparative Examples 1 and 2. From this, it turns out that the production amount of LaOF differs due to the difference in the temperature raising rate, and the production amount of LaOF tends to be increased when the temperature raising rate is low in the heat treatment step.

Products included in each of the phosphor compositions obtained in Examples 1 to 4 and Comparative Examples 1 and 2 were recognized using the XRD spectra, and quantitative evaluation for the products was executed based on the RIR method. $La_3Si_6N_{11}$ (No. 01-083-9962) and LaOF (No. 01-085-3679) were used as the RIR values. Table 1 shows the content ratio LaOF/(LSN+LaOF) of LaOF calculated as the ratio of the quantitative value to the sum of the quantitative value of $La_3Si_6N_{11}$ that was the nitride phosphor and the quantitative value of LaOF that was the oxyfluoride in each of the phosphor compositions, determined based on the RIR method. The mole content of the oxyfluoride to 1 mole of the nitride phosphor was also calculated based on the above compositions. The sign "±" in Table 1 means the range of the measurement error of the lanthanum oxyfluoride.

From Table 1, for the phosphor compositions obtained in Examples 1 to 4, the content ratio of LaOF based on mass was 3.3±0.3% to 6.1±0.6%. It turns out that, in contrast, the content ratio of LaOF based on mass of the phosphor composition of each of Comparative Examples 1 and 2 was lower than 1.0%.

For the composition of each of the phosphor compositions obtained in Examples 1 to 4 and Comparative examples 1 and 2, an analysis was executed on the content of each of the constituent elements using an X-ray fluorescence analysis (XRF) apparatus; manufactured by Rigaku Corporation, an ion chromatography (IC) apparatus: manufactured by Nippon Dionex, and an oxygen and nitrogen analysis apparatus: manufactured by HORIBA Ltd. Assuming that the composition of the nitride phosphor was $(La, Ce)_3Si_6N_{11}$ and employing Si=6 as the criterion, the content of each of the component elements other than those of the nitride phosphor in the analysis result was calculated as a mole content of each of the constituent components other than those of the nitride phosphor to 1 mole of the nitride phosphor. Assuming that the composition of the oxyfluoride was LaOF and based on the content of La other than that of the nitride phosphor in the analysis result, the mole content of the oxyfluoride to 1 mole of the nitride phosphor was next calculated. The content of each of the component elements other than those of the nitride phosphor and the oxyfluoride in the analysis result was further calculated as the mole content of the excessive elements to 1 mole of the nitride phosphor after subtracting the content of the nitride phosphor and the content of the oxyfluoride from the analysis result. Table 1 shows the results.

From Table 1, for the phosphor composition obtained in each of Examples 1 to 4, the content of LaOF was 0.13 mol to 0.58 mol in the case where the amount of $(La, Ce)_3Si_6N_{11}$ was 1 mol. In contrast, it turns out that, for the phosphor composition obtained in each of Comparative Examples 1 and 2, the content of LaOF was less than 0.05 mol in the case where the content of $(La, Ce)_3Si_6N_{11}$ was 1 mol.

TABLE 1

| | 1200-1400° C. Temperature raising rate (° C./h) | RIR method LaOF (%) | RIR method LaOF (mol) | Composition analysis (La,Ce)$_3$Si$_6$N$_{11}$ = 1 mol Excessive element (mol) O | Composition analysis (La,Ce)$_3$Si$_6$N$_{11}$ = 1 mol Excessive element (mol) F | LaOF (mol) |
|---|---|---|---|---|---|---|
| Example 1 | 25 | 3.3 ± 0.3 | 0.15 ± 0.02 | 0.03 | 0.02 | 0.15 |
| Example 2 | 10 | 5.2 ± 0.4 | 0.23 ± 0.20 | 0.03 | 0.04 | 0.26 |
| Example 3 | 5 | 6.1 ± 0.6 | 0.28 ± 0.30 | 0.03 | 0.03 | 0.24 |
| Example 4 | 1 | 5.6 ± 0.5 | 0.26 ± 0.03 | 0.11 | 0.02 | 0.21 |
| Comparative Example 1 | 300 | 0.3 ± 0.1 | 0.02 ± 0.01 | 0.17 | 0.05 | 0.00 |
| Comparative Example 2 | 50 | 0.8 ± 0.2 | 0.04 ± 0.01 | 0.05 | 0.01 | 0.03 |

For the phosphor composition of each of Examples and Comparative Examples, the volume average particle diameter Dm (μm) was measured by the micro-pore electric resistance method (the electric detection band method) based on the Coulter principle and using a particle size distribution measuring apparatus (Multisizer manufactured by Beckman Coulter, Inc.). The chromaticity (x, y) and the light emission brightness (ENG: %) of each of the phosphor compositions of Examples and Comparative Examples were measured at the room temperature (25° C.) using a fluorescence analysis photometer QE-2000 (manufactured by Otsuka Electronics Co., Ltd.) and setting the wavelength of the excitation light to be 450 nm. The light emission brightness (ENG: %) at each of the temperatures (from the room temperature to 300° C.) of each of the phosphor compositions was measured using F-4500E (manufactured by Hitachi High-Tech Science Corporation) and setting the wavelength of the excitation light to be 450 nm. From the measurement result of the emission spectra, the brightness ratio (the relative ENG: %) obtained when the emission brightness (ENG: %) of the Comparative Example 2 was set to be 100% was calculated for the emission brightness (ENG: %) of each of the phosphor compositions. For the temperature property of each of the phosphor compositions, the maintenance rate (%) of the emission brightness at 300° C. to the emission brightness at the room temperature was calculated as the relative maintenance rate (%) obtained when the maintenance rate (%) of that of Comparative Example 1 was set to be 100%. Table 2 shows the average particle diameter Dm (μm), the emission brightness (the relative ENG: %), and the maintenance rate (%) of each of the phosphor compositions.

Figure 3:
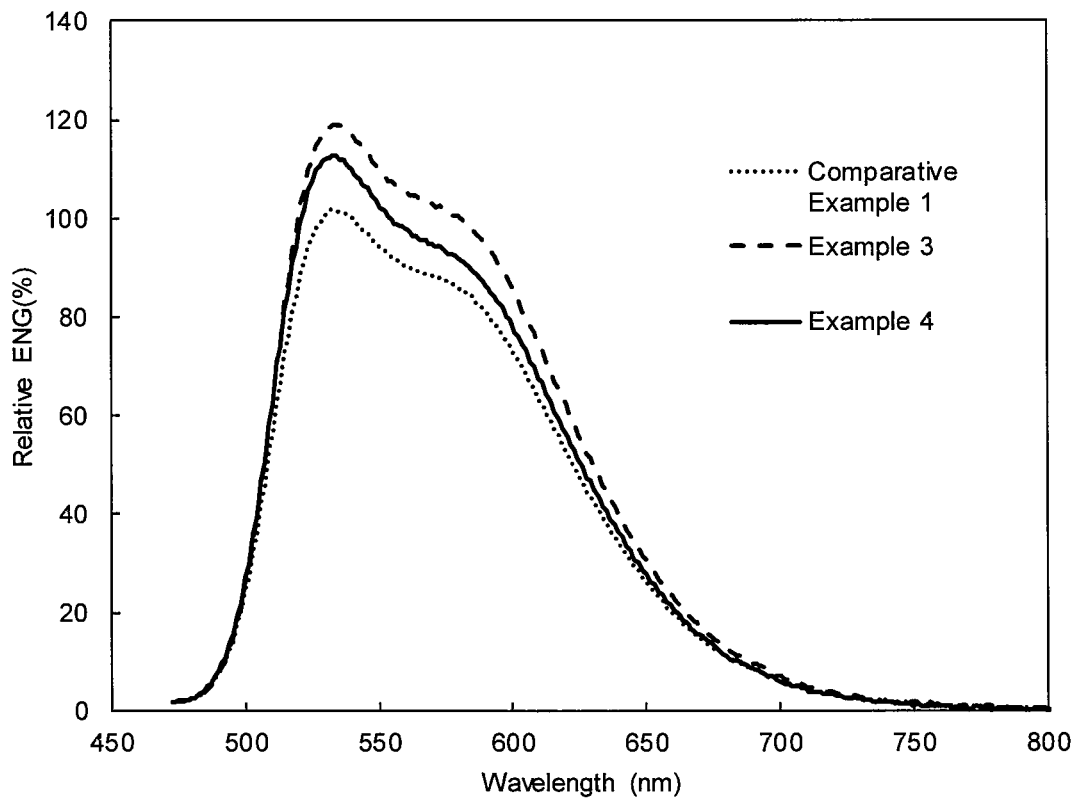
FIG. 3 is exemplary light emission spectra of the phosphor compositions according to Examples 3 and 4, and Comparative Example 1.
Figure 4:
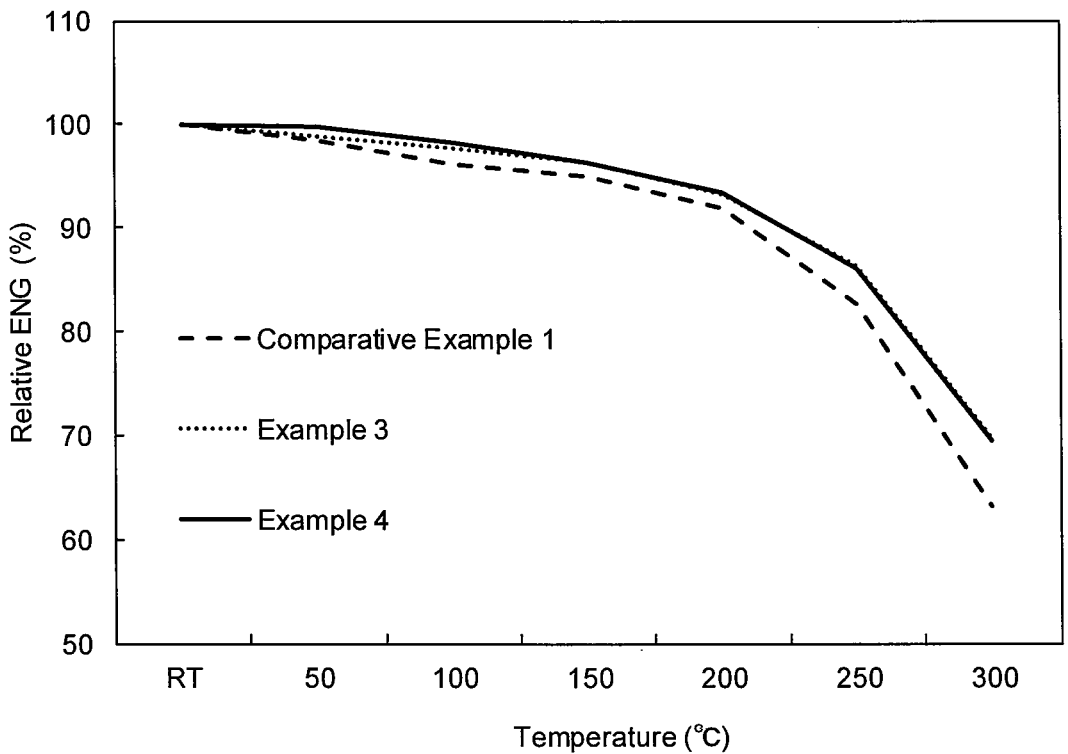
FIG. 4 is exemplary temperature property of each of the phosphor compositions according to Examples 3 and 4, and Comparative Example 1.

FIG. 3 shows light emission spectra at 25° C. for the phosphor compositions of Example 3, Example 4, and Comparative Example 1. FIG. 4 shows the relation between the measurement temperature and the emission brightness (the relative ENG: %) for the phosphor of each of Example 3, Example 4, and Comparative Example 1.

TABLE 2

| | 1200-1400° C. Temperature raising rate (° C./h) | Dm (μm) | Chromaticity x | Chromaticity y | Relative ENG (%) | 300° C. ENG maintenance rate (%) |
|---|---|---|---|---|---|---|
| Example 1 | 25 | 16.1 | 0.426 | 0.552 | 111.2 | 106.4 |
| Example 2 | 10 | 16.5 | 0.426 | 0.552 | 117.5 | 107.7 |
| Example 3 | 5 | 17.3 | 0.426 | 0.553 | 116.2 | 114.2 |
| Example 4 | 1 | 14.2 | 0.420 | 0.556 | 108.2 | 113.9 |
| Comparative Example 1 | 300 | 13.1 | 0.424 | 0.553 | 100.1 | 100.0 |
| Comparative Example 2 | 50 | 15.8 | 0.426 | 0.552 | 100.0 | 106.1 |

From Table 2, it turns out that, compared to the brightness of the phosphor composition of Comparative Example 2 whose temperature raising rate was 50° C. per hour in the second temperature raising step thereof, the emission brightness of each of the phosphor compositions of Examples 1 to 4 was increased by about 8% to about 17%. From Table 2, compared to the temperature property of the phosphor of Comparative Example 1 whose temperature raising rate was 300° C. per hour in the second temperature raising step thereof, the temperature property at 300° C. of each of the phosphor components of Examples 1 to 4 was improved from 6.4% to about 14%. It may be considered that this is because, for example, the influence of the oxygen captured in the composition of the nitride phosphor was reduced and a stable crystal structure was retained, and the influence by the heat causing the property degradation was thereby suppressed. It may be considered based on this result that, even when the phosphor composition is combined with a light emitting element such as an LD used at high power or a high-power LED, the nitride phosphor is further excellent in the light emission property. It turns out from the above results that, compared to the phosphor composition of Comparative Example 1 or 2, the phosphor composition of each of Examples 1 to 4 had high brightness and had an excellent light emission property with an improved temperature property.

The disclosure of Japanese Patent Application Publication No. 2020-086858 (Filing Date: May 18, 2020) is incorporated herein in its entirety by reference. All the literatures, all the patent applications, and all the technical standards described herein are incorporated herein to the extent same as that of the case where it is specifically and individually described that each of the literatures, the patent applications, and the technical standards is incorporated herein by reference.

The invention claimed is:

1. A phosphor composition comprising consisting of:
   a nitride phosphor that comprises silicon, nitrogen, cerium, and an element M that is at least one selected from the group consisting of Sc, Y, La, Gd, Tb, and Lu; and
   an oxyfluoride,
   wherein in the phosphor composition, a content of the oxyfluoride relative to the phosphor composition is 1.5% by mass or higher and 10% by mass or lower according to an X-ray diffraction reference intensity ratio method, and
   wherein the oxyfluoride has a composition represented by Formula (2) below,
   $MO_tF_u$ (2), wherein
   M comprises at least one selected from the group consisting of Sc, Y, La, Gd, Tb, and Lu,
   t satisfies $0 < t \leq 2.0$, and
   u satisfies $0 < u \leq 3.5$.

2. The phosphor composition according to claim 1, wherein
the nitride phosphor has a composition that is represented by Formula (1) below,
$M_p Si_q N_r:Ce_s$ (1), wherein
M comprises at least one selected from the group consisting of Sc, Y, La, Gd, Tb, and Lu,
p satisfies $2.5 \leq p \leq 3.3$,
q satisfies $5.4 \leq q \leq 6.6$,
r satisfies $10 \leq r \leq 12$, and
s satisfies $0 < s \leq 0.8$.

3. The phosphor composition according to claim 1, wherein
the content of the oxyfluoride is 3% by mass or higher and 6.7% by mass or lower according to an X-ray diffraction reference intensity ratio method.

4. The phosphor composition according to claim 1, wherein
a content of the oxyfluoride relative to 1 mole of the nitride phosphor is 0.15 moles or more and 0.26 moles or less.

5. The phosphor composition according to claim 1, wherein a volume average particle diameter of the phosphor composition is 5 μm or larger and 35 μm or smaller.

6. A method for manufacturing a phosphor composition according to claim 1, the method comprising:
providing a raw material mixture that comprises:
an element M source comprising an element M that is at least one selected from the group consisting of rare earth elements except cerium,
a cerium source, a silicon source, and a metal fluoride; and
obtaining a heat-treated substance by raising a temperature of the raw material mixture and heat-treating the raw material mixture at a predetermined temperature in a range of higher than 1,200° C. and 1,800° C. or lower, wherein
in heat-treating the raw material mixture, a temperature raising rate to 1,200° C. is 250° C. or higher per hour and 400° C. or lower per hours, and
in heat-treating the raw material mixture, a temperature raising rate for raising from 1,200° C. to the predetermined temperature is lower than 50° C. per hour.

7. The method for manufacturing a phosphor composition according to claim 6, wherein an atmosphere in heat-treating the raw material mixture is a reducing atmosphere.

8. The method for manufacturing a phosphor composition according to claim 6, further comprising:
after obtaining the heat-treated substance, the heat-treated substance is dispersed in a liquid medium to obtain a dispersion; and
applying solid-liquid separation to the dispersion to obtain a solid component.

9. The method for manufacturing a phosphor composition according to claim 8, further comprising:
bringing the solid component into contact with a liquid medium comprising an acid component, and
removing at least a portion of the acid component adhering to the solid component.

10. The method for manufacturing a phosphor composition according to claim 6, wherein
in heat-treating the raw material mixture, a temperature raising rate from 1,200° C. to 1,400° C. is 20° C. or lower per hour.

* * * * *